US012573395B2

(12) United States Patent
Soni et al.

(10) Patent No.: US 12,573,395 B2
(45) Date of Patent: Mar. 10, 2026

(54) SYSTEMS, METHODS, AND STORAGE MEDIA FOR PROVIDING AN INTERFACE FOR TEXTUAL EDITING THROUGH SPEECH

(71) Applicant: Suki AI, Inc., Redwood City, CA (US)

(72) Inventors: Punit Soni, Los Altos, CA (US);
Karthik Rajan, Foster City, CA (US);
Erin Palm, Redwood City, CA (US);
Matthew Pallakoff, Mountain View,
CA (US); Sanket Agarwal, San
Francisco, CA (US)

(73) Assignee: Suki AI, Inc., Redwood City, CA (US)

( * ) Notice: Subject to any disclaimer, the term of this patent is extended or adjusted under 35 U.S.C. 154(b) by 175 days.

(21) Appl. No.: 18/310,363

(22) Filed: May 1, 2023

(65) Prior Publication Data

US 2023/0267931 A1      Aug. 24, 2023

Related U.S. Application Data

(63) Continuation of application No. 16/283,041, filed on Feb. 22, 2019, now Pat. No. 11,670,291.

(51) Int. Cl.
| | |
|---|---|
| *G10L 15/22* | (2006.01) |
| *G06F 40/166* | (2020.01) |
| *G10L 15/30* | (2013.01) |

(52) U.S. Cl.
CPC ............ *G10L 15/22* (2013.01); *G06F 40/166* (2020.01); *G10L 15/30* (2013.01); *G10L 2015/223* (2013.01)

(58) Field of Classification Search
CPC ... G10L 15/22; G10L 15/26; G10L 2015/223; G10L 15/1815; G06F 40/279; G06F 40/284; G06F 40/295

(Continued)

(56) References Cited

U.S. PATENT DOCUMENTS

| | | | | |
|---|---|---|---|---|
| 5,231,670 A | * | 7/1993 | Goldhor | .................. G10L 15/18 |
| | | | | 704/275 |
| 6,125,347 A | * | 9/2000 | Cote | ....................... G10L 15/32 |
| | | | | 704/275 |

(Continued)

FOREIGN PATENT DOCUMENTS

| | | | | |
|---|---|---|---|---|
| EP | 2634715 A1 | * | 9/2013 | ............. G06F 17/28 |
| WO | 2009025933 | | 2/2009 | |

*Primary Examiner* — Martin Lerner
(74) *Attorney, Agent, or Firm* — Esplin & Associates, PC

(57) ABSTRACT

Systems, methods, and storage media for providing an interface for textual editing through speech are disclosed. One aspect of the disclosure may include storing a textual message and presenting the textual message via a client computing platform. Speech uttered by a user may be received. Speech recognition may be performed on the speech to determine words spoken by the user. The words determined from the speech may be analyzed to detect whether an editing command was spoken. The editing command may include a spoken parameter identifier and an edited value for a parameter. The editing command may be processed to insert the edited value for the parameter or replace an initial value to the parameter with the edited value. Information may be transmitted to the client computing platform that causes the textual message to be visually presented including edits based on the editing command.

18 Claims, 7 Drawing Sheets

(58) Field of Classification Search
USPC ........................................ 704/235, 270, 275
See application file for complete search history.

(56)                References Cited

U.S. PATENT DOCUMENTS

| | | | | |
|---|---|---|---|---|
| 6,839,669 | B1 * | 1/2005 | Gould | G10L 15/22 |
| | | | | 704/275 |
| 7,225,131 | B1 * | 5/2007 | Bangalore | G10L 15/26 |
| | | | | 704/275 |
| 8,374,868 | B2 | 2/2013 | Arun | |
| 8,954,329 | B2 * | 2/2015 | Labsky | G10L 15/14 |
| | | | | 704/9 |
| 9,043,206 | B2 | 5/2015 | Roberge | |
| 9,236,045 | B2 * | 1/2016 | Labsky | G10L 15/14 |
| 9,390,079 | B1 | 7/2016 | Reicher | |
| 9,569,593 | B2 | 2/2017 | Casella Dos Santos | |
| 10,971,151 | B1 | 4/2021 | Rajan | |
| 11,176,939 | B1 | 11/2021 | Agarwal | |
| 11,501,762 | B2 * | 11/2022 | Tran | G10L 15/22 |
| 11,670,291 | B1 * | 6/2023 | Soni | G10L 15/22 |
| | | | | 704/251 |
| 12,183,321 | B2 * | 12/2024 | Beaufays | G10L 15/22 |
| 2007/0244700 | A1 * | 10/2007 | Kahn | G10L 15/22 |
| | | | | 704/235 |

| | | | | |
|---|---|---|---|---|
| 2008/0059182 | A1 | 3/2008 | Benja-Athon | |
| 2009/0037171 | A1 | 2/2009 | McFarland | |
| 2009/0187407 | A1 | 7/2009 | Soble | |
| 2010/0169098 | A1 | 7/2010 | Patch | |
| 2011/0077974 | A1 | 3/2011 | Albro | |
| 2011/0301943 | A1 | 12/2011 | Patch | |
| 2012/0004910 | A1 | 1/2012 | Quidilig | |
| 2012/0323574 | A1 | 12/2012 | Wang | |
| 2013/0298016 | A1 | 11/2013 | Chigier | |
| 2013/0304453 | A9 | 11/2013 | Fritsch | |
| 2014/0164023 | A1 | 6/2014 | Yegnanarayanan | |
| 2014/0288973 | A1 | 9/2014 | Carus | |
| 2014/0316772 | A1 | 10/2014 | Koll | |
| 2015/0312175 | A1 * | 10/2015 | Langholz | G06F 3/16 |
| | | | | 715/752 |
| 2016/0232329 | A1 | 8/2016 | Xu | |
| 2017/0046320 | A1 | 2/2017 | Reicher | |
| 2017/0263248 | A1 | 9/2017 | Gruber | |
| 2018/0166074 | A1 * | 6/2018 | Aggarwal | G10L 15/22 |
| 2018/0189250 | A1 | 7/2018 | Lee | |
| 2019/0027149 | A1 | 1/2019 | Vogel | |
| 2019/0122766 | A1 * | 4/2019 | Strader | G06F 40/279 |
| 2019/0209764 | A1 | 7/2019 | Buraczenski | |
| 2019/0392926 | A1 | 12/2019 | Koh | |
| 2020/0250453 | A1 | 8/2020 | Gupta | |
| 2022/0036883 | A1 * | 2/2022 | Tran | G10L 15/22 |
| 2025/0013429 | A1 * | 1/2025 | Kogan | G06F 3/167 |

* cited by examiner

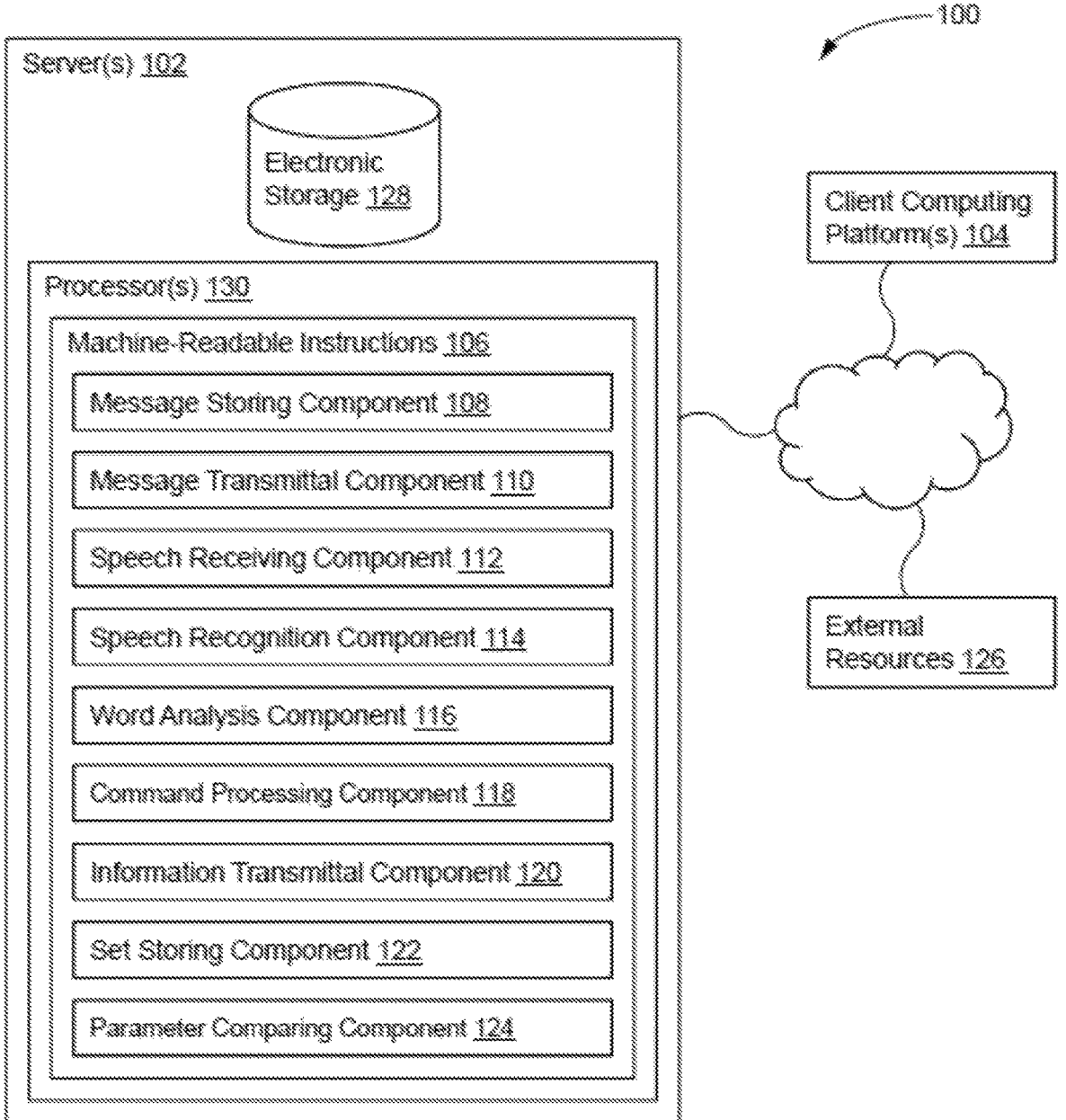

Server(s) 102

Electronic Storage 128

Processor(s) 130

Machine-Readable Instructions 106

Message Storing Component 108

Message Transmittal Component 110

Speech Receiving Component 112

Speech Recognition Component 114

Word Analysis Component 116

Command Processing Component 118

Information Transmittal Component 120

Set Storing Component 122

Parameter Comparing Component 124

Client Computing Platform(s) 104

External Resources 126

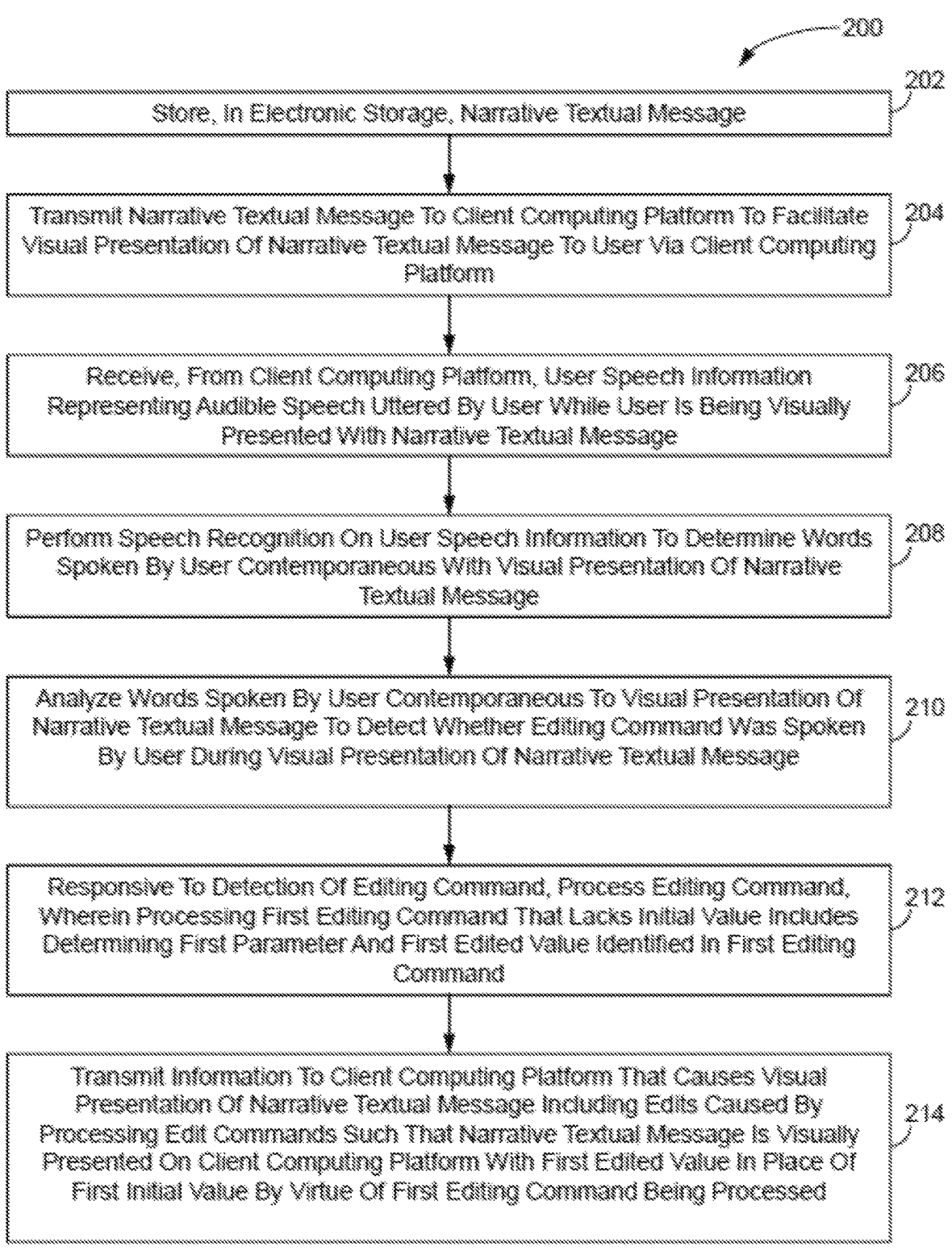

200

202
Store, In Electronic Storage, Narrative Textual Message

204
Transmit Narrative Textual Message To Client Computing Platform To Facilitate Visual Presentation Of Narrative Textual Message To User Via Client Computing Platform 206
Receive, From Client Computing Platform, User Speech Information Representing Audible Speech Uttered By User While User Is Being Visually Presented With Narrative Textual Message 208
Perform Speech Recognition On User Speech Information To Determine Words Spoken By User Contemporaneous With Visual Presentation Of Narrative Textual Message 210
Analyze Words Spoken By User Contemporaneous To Visual Presentation Of Narrative Textual Message To Detect Whether Editing Command Was Spoken By User During Visual Presentation Of Narrative Textual Message 212
Responsive To Detection Of Editing Command, Process Editing Command, Wherein Processing First Editing Command That Lacks Initial Value Includes Determining First Parameter And First Edited Value Identified In First Editing Command 214
Transmit Information To Client Computing Platform That Causes Visual Presentation Of Narrative Textual Message Including Edits Caused By Processing Edit Commands Such That Narrative Textual Message Is Visually Presented On Client Computing Platform With First Edited Value In Place Of First Initial Value By Virtue Of First Editing Command Being Processed

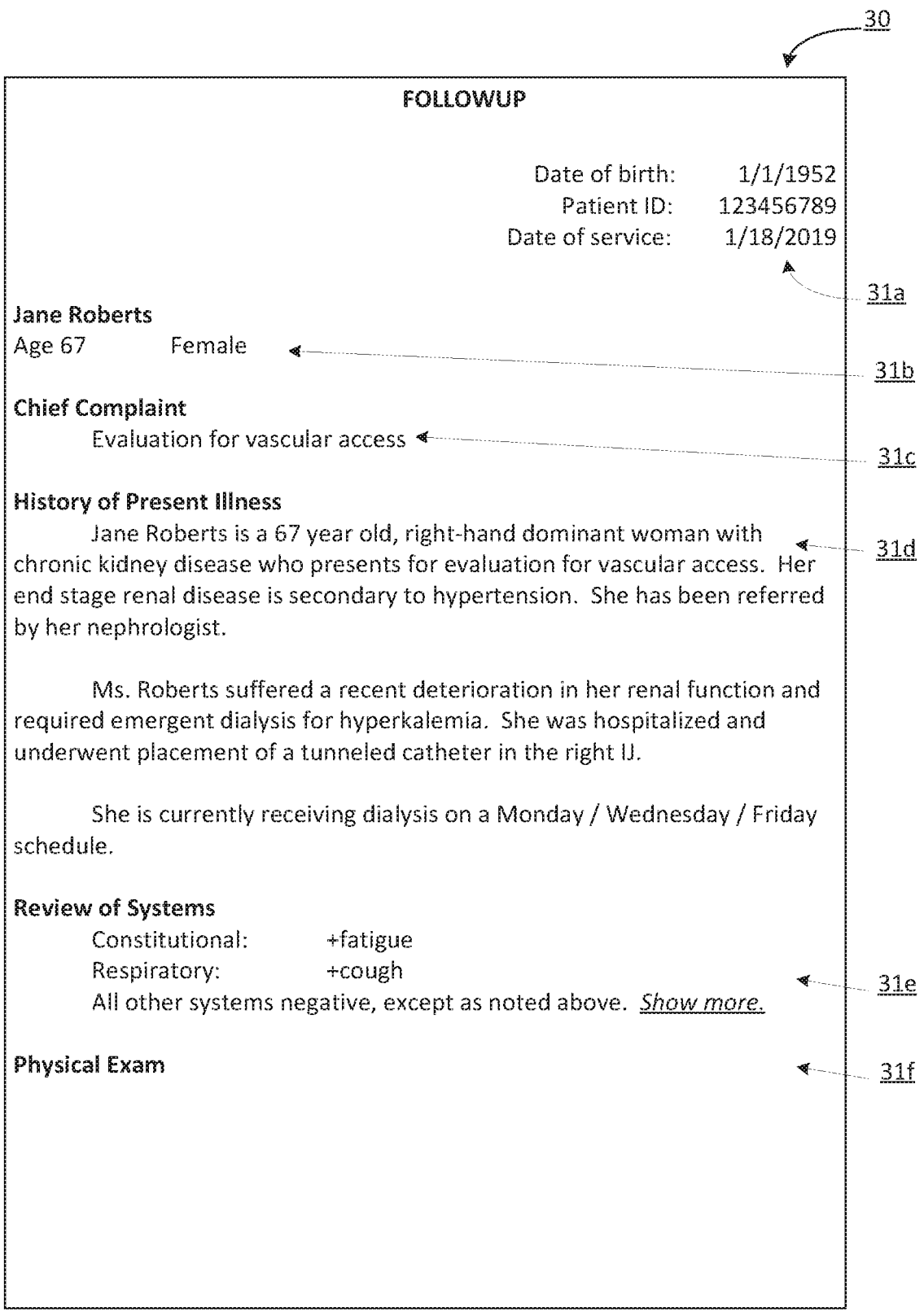

FOLLOWUP

|  |  |
|---|---|
| Date of birth: | 1/1/1952 |
| Patient ID: | 123456789 |
| Date of service: | 1/18/2019 |

31a

Jane Roberts
Age 67      Female

31b

Chief Complaint
    Evaluation for vascular access

31c

History of Present Illness
    Jane Roberts is a 67 year old, right-hand dominant woman with chronic kidney disease who presents for evaluation for vascular access. Her end stage renal disease is secondary to hypertension. She has been referred by her nephrologist.

31d

Ms. Roberts suffered a recent deterioration in her renal function and required emergent dialysis for hyperkalemia. She was hospitalized and underwent placement of a tunneled catheter in the right IJ.

She is currently receiving dialysis on a Monday / Wednesday / Friday schedule.

Review of Systems
    Constitutional:      +fatigue
    Respiratory:      +cough
    All other systems negative, except as noted above. *Show more.*

31e

Physical Exam

FOLLOWUP

|  |  |
|---|---|
| Date of birth: | 1/1/1952 |
| Patient ID: | 123456789 |
| Date of service: | 1/18/2019 |

Jane Roberts
Age 67          Female

Chief Complaint
    Evaluation for vascular access

History of Present Illness
    Jane Roberts is a 67 year old, right-hand dominant woman with chronic kidney disease who presents for evaluation for vascular access. Her end stage renal disease is secondary to hypertension. She has been referred by her nephrologist.

Ms. Roberts suffered a recent deterioration in her renal function and required emergent dialysis for hyperkalemia. She was hospitalized and underwent placement of a tunneled catheter in the right IJ.

She is currently receiving dialysis on a Monday / Wednesday / Friday schedule.

Review of Systems
    Constitutional:       +fatigue
    Respiratory:         +cough
    All other systems negative, except as noted above. *Show more.*

Physical Exam

31f

*General: well-appearing, no apparent distress*
    *Heart rate:*       *75 BPM*
    *Blood pressure:*    *130/91*

FOLLOWUP

|  |  |
|---|---|
| Date of birth: | 1/1/1952 |
| Patient ID: | 123456789 |
| Date of service: | 1/18/2019 |

Jane Roberts
Age 67　　　Female

Chief Complaint
　　Evaluation for vascular access

History of Present Illness
　　Jane Roberts is a 67 year old, right-hand dominant woman with chronic kidney disease who presents for evaluation for vascular access. Her end stage renal disease is secondary to hypertension. She has been referred by her nephrologist.

Ms. Roberts suffered a recent deterioration in her renal function and required emergent dialysis for hyperkalemia. She was hospitalized and underwent placement of a tunneled catheter in the right IJ.

She is currently receiving dialysis on a Monday / Wednesday / Friday schedule.

Review of Systems
　　Constitutional:　　　　+fatigue
　　Respiratory:　　　　　+cough
　　All other systems negative, except as noted above. *Show more.*

Physical Exam
　　General: well-appearing, no apparent distress　　◄ - - - - - - - - 31f
　　Heart rate:　　　　75 BPM　　　　　　　　　　　　　　51
　　*Blood pressure:　　140/91*

*Fig. 5*

60

FOLLOWUP

| | |
|---|---|
| Date of birth: | 1/1/1952 |
| Patient ID: | 123456789 |
| Date of service: | 1/18/2019 |

Jane Roberts
Age 67       Female

Chief Complaint
     Evaluation for vascular access

History of Present Illness
     Jane Roberts is a 67 year old, right-hand dominant woman with chronic kidney disease who presents for evaluation for vascular access. Her end stage renal disease is secondary to hypertension. She has been referred by her nephrologist.

Ms. Roberts suffered a recent deterioration in her renal function and required emergent dialysis for hyperkalemia. She was hospitalized and underwent placement of a tunneled catheter in the right IJ.

She is currently receiving dialysis on a Monday / Wednesday / Friday schedule.

Review of Systems
     Constitutional:      +fatigue
     Respiratory:      +cough
     All other systems negative, except as noted above. _Show more._

Physical Exam
     General: well-appearing, no apparent distress    ◄ ........... 31f
     _Heart rate:_      _65 BPM_    61
     Blood pressure:      140/91

FOLLOWUP

|  |  |
|---|---|
| Date of birth: | 1/1/1952 |
| Patient ID: | 123456789 |
| Date of service: | 1/18/2019 |

Jane Roberts
Age 67          Female

Chief Complaint
        Evaluation for vascular access

History of Present Illness
        Jane Roberts is a 67 year old, right-hand dominant woman with ◄ _31d_
chronic kidney disease who presents for evaluation for vascular access. Her
end stage renal disease is secondary to hypertension. She has been referred
by her nephrologist.

_Ms. Roberts recently suffered deteriorated renal function and required dialysis for hyperkalemia. She was hospitalized. A tunneled catheter was placed in her left IJ._  _71_

_She is currently receiving dialysis on a Tuesday / Thursday schedule._  _72_

Review of Systems
        Constitutional:          +fatigue
        Respiratory:              +cough
        All other systems negative, except as noted above. _Show more._

Physical Exam
        General: well-appearing, no apparent distress
        Heart rate:              65 BPM
        Blood pressure:        140/91

_Fig. 7_

SYSTEMS, METHODS, AND STORAGE MEDIA FOR PROVIDING AN INTERFACE FOR TEXTUAL EDITING THROUGH SPEECH

FIELD OF THE DISCLOSURE

The present disclosure relates to systems, methods, and storage media for providing an interface for textual editing through speech.

BACKGROUND

Speech recognition is known. User interfaces for editing, including text editing, are known.

SUMMARY

One aspect of the present disclosure relates to a system configured for providing an interface for textual editing through speech. The system may include one or more hardware processors configured by machine-readable instructions. The processor(s) may be configured to store, in electronic storage, a narrative textual message. The narrative textual message may define a state of a message object. The narrative textual message may express parameter values for parameters that describe the state of the message object. The processor(s) may be configured to transmit the narrative textual message to a client computing platform to facilitate visual presentation of the narrative textual message to a user via the client computing platform. The processor(s) may be configured to receive, from the client computing platform, user speech information representing audible speech uttered by the user while the user is being visually presented with the narrative textual message. The processor(s) may be configured to perform speech recognition on the user speech information to determine words spoken by the user contemporaneous with visual presentation of the narrative textual message. The processor(s) may be configured to analyze the words spoken by the user contemporaneous to visual presentation of the narrative textual message to detect whether an editing command was spoken by the user during visual presentation of the narrative textual message. An editing command may indicate a request for an edit to an initial value of one of the parameters expressed in the narrative textual message, an edited value to which the initial value is to be edited, and/or other information. The processor(s) may be configured to, responsive to detection of the editing command, process the editing command, wherein processing the editing command includes identifying a first parameter and the edited value. Processing the editing command that lacks the initial value may include inserting the edited value for the first parameter. Processing the editing command that includes the initial value includes editing the narrative textual message by replacing the initial value for one of the parameters in the narrative textual message with the edited value. The processor(s) may be configured to transmit information to the client computing platform that causes visual presentation of the narrative textual message including edits caused by processing the editing command such that the narrative textual message is visually presented on the client computing platform with the edited value in place of the initial value by virtue of the editing command being processed.

Another aspect of the present disclosure relates to a method for providing an interface for textual editing through speech. The method may include storing, in electronic storage, a narrative textual message. The narrative textual message may define a state of a message object. The narrative textual message may express parameter values for parameters that describe the state of the message object. The method may include transmitting the narrative textual message to a client computing platform to facilitate visual presentation of the narrative textual message to a user via the client computing platform. The method may include receiving, from the client computing platform, user speech information representing audible speech uttered by the user while the user is being visually presented with the narrative textual message. The method may include performing speech recognition on the user speech information to determine words spoken by the user contemporaneous with visual presentation of the narrative textual message. The method may include analyzing the words spoken by the user contemporaneous to visual presentation of the narrative textual message to detect whether an editing command was spoken by the user during visual presentation of the narrative textual message. An editing command may indicate a request for an edit to an initial value of one of the parameters expressed in the narrative textual message and an edited value to which the initial value is to be edited. The method may include, responsive to detection of the editing command, processing the editing command, wherein processing the editing command may include identifying a first parameter, a first edited value, and/or other information. Processing the editing command that lacks the initial value may include inserting the edited value for the first parameter. Processing the editing command that includes the initial value may include editing the narrative textual message by replacing the initial value for one of the parameters in the narrative textual message with the edited value. The method may include transmitting information to the client computing platform that causes visual presentation of the narrative textual message including edits caused by processing the editing command such that the narrative textual message is visually presented on the client computing platform with the edited value in place of the initial value by virtue of the editing command being processed.

Yet another aspect of the present disclosure relates to a non-transient computer-readable storage medium having instructions embodied thereon, the instructions being executable by one or more processors to perform a method for providing an interface for textual editing through speech. The method may include storing, in electronic storage, a narrative textual message. The narrative textual message may define a state of a message object. The narrative textual message may express parameter values for parameters that describe the state of the message object. The method may include transmitting the narrative textual message to a client computing platform to facilitate visual presentation of the narrative textual message to a user via the client computing platform. The method may include receiving, from the client computing platform, user speech information representing audible speech uttered by the user while the user is being visually presented with the narrative textual message. The method may include performing speech recognition on the user speech information to determine words spoken by the user contemporaneous with visual presentation of the narrative textual message. The method may include analyzing the words spoken by the user contemporaneous to visual presentation of the narrative textual message to detect whether an editing command was spoken by the user during visual presentation of the narrative textual message. An editing command may indicate a request for an edit to an initial value of one of the parameters expressed in the narrative textual message and an edited value to which the initial value is to be edited. The method may include, responsive to detection of the editing command, processing the editing command, wherein processing the editing command includes identifying a first parameter and the edited value. Processing the editing command that lacks the initial value may include inserting the edited value for the first parameter. Processing the editing command that includes the initial value includes editing the narrative textual message by replacing the initial value for one of the parameters in the narrative textual message with the edited value. The method may include transmitting information to the client computing platform that causes visual presentation of the narrative textual message including edits caused by processing the editing command such that the narrative textual message is visually presented on the client computing platform with the edited value in place of the initial value by virtue of the editing command being processed.

As used herein, any association (or relation, or reflection, or indication, or correspondence) involving servers, processors, client computing platforms, messages, message objects, parameters, parameter values, states of message objects, spoken words, visual presentations, editing commands, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 1 illustrates a system configured for providing an interface for textual editing through speech, in accordance with one or more implementations.

FIG. 2 illustrates a method for providing an interface for textual editing through speech, in accordance with one or more implementations.

FIGS. 3-7 illustrate exemplary implementations of interfaces for textual editing through speech, in accordance with one or more implementations.

DETAILED DESCRIPTION

FIG. 1 illustrates a system 100 configured for providing an interface for textual editing through speech, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104, e.g., via user interfaces of client computing platform(s) 104.

Server(s) 102 may be configured by machine-readable instructions 106. Machine-readable instructions 106 may include one or more instruction components. The instruction components may include computer program components. The instruction components may include one or more of message storing component 108, message transmittal component 110, speech receiving component 112, speech recognition component 114, word analysis component 116, command processing component 118, information transmittal component 120, set storing component 122, parameter comparing component 124, and/or other instruction components.

Message storing component 108 may be configured to store information in electronic storage, including but not limited to electronic storage 128. In some implementations, message storing component 108 may be configured to store textual messages, including but not limited to narrative textual messages. As used herein, the term "narrative" refers to a story or account of events, experiences, conditions, or the like. In some implementations, narrative textual messages may define states of message objects. In some implementations, narrative textual messages may define states of message objects using human-readable language. In some implementations, narrative textual messages may express parameters values for parameters that describe states of message objects. By way of non- limiting example, a user of system 100 may be a medical professional, caregiver, and/or another type of professional. By way of non-limiting example, a message object may be a medical patient and/or other patient or client. By way of non-limiting example, a narrative textual message may be a record, report, note, and/or other form of documentation regarding a medical patient (or client), including but not limited to documentation regarding a treatment, procedure, and/or visit involving the medical patient (or client). Depending on the type of medical professional, the medical patient, the nature of the treatment, procedure, and/or visit, different parameters may describe states (e.g., current health conditions, current treatments, etc.) of a medical patient. For example, the state of a patient of a dentist may be described by different parameters than the state of a patient of a cardiologist. For example, in some implementations, individual parameters may correspond to individual assessments and/or measurements by medical professionals.

In some implementations, the state of a particular message object may be defined using multiple narrative textual messages. In some implementations, a particular state of a message object may be described using multiple parameters, each having one or more parameter values. In some implementations, electronic storage 128 and/or one or more physical processors 130 may be configured such that a narrative textual message is part of an electronic medical record of the medical patient.

Message transmittal component 110 may be configured to transmit messages to client computing platforms 104, e.g., to facilitate visual presentation of the transmitted messages to users. In some implementations, the transmitted messages may include one or more narrative textual messages, including but not limited to narrative textual messages stored in electronic storage 128, edited narrative textual messages, and/or other messages. In some implementations, message transmittal component 110 may be configured to transmit a narrative textual message to a particular client computing platform to facilitate visual presentation of the narrative textual message to a user via the particular client computing platform. By way of non-limiting example, visual presentation of narrative textual messages and/or other information may be facilitated through a display and/or graphical user interface of the particular client computing platform. In some implementations, the user may be a caregiver. By way of non-limiting example, FIG. 3 illustrates an exemplary implementation of an interface for textual editing of a narrative textual message 30 through speech, as may be provided by system 100. As depicted, narrative textual message 30 may be a record of a visit by a medical patient (in this case Ms. Jane Roberts) to her doctor, a medical professional/caregiver. Narrative textual message 30 may be presented visually to her doctor as depicted in FIG. 3. Narrative textual message 30 may include different sections, such as sections 31*a*-31*b*-31*c*-31*d*-31*e*-31*f*. The contents for these sections may be provided by a user and/or assistant, based on a template, populated based on older reports, and/or otherwise provided through various combinations of manual and automated input. In some implementations, individual sections may include a header and a body, though this is merely exemplary and not intended to be limiting in any way. For example, section 31*f* (labeled "physical exam") includes only a header in FIG. 3.

Referring to FIG. 1, speech receiving component 112 may be configured to receive user speech information, and/or other information. In some implementations, user speech information may represent audible speech uttered by users. In some implementations, user speech information may include information based on audible speech uttered by users. In some implementations, speech receiving component 112 may be configured to receive user speech information from client computing platforms 104. For example, a particular client computing platform may include a microphone configured to capture audible speech uttered by a particular user. In some implementations, user speech information may represent audible speech uttered by users while the users are being visually presented with narrative textual messages. For example, users may dictate a narrative message for inclusion and/or other use in a narrative textual message.

Speech recognition component 114 may be configured to perform speech recognition on captured audible speech (and/or information derived therefrom), user speech information, and other information to identify and/or determine words spoken by one or more users. In some implementations, speech recognition may be performed on speech information to determine words spoken by a particular user contemporaneous with visual presentation of a narrative textual message to the same particular user.

Word analysis component 116 may be configured to analyze words spoken by users, e.g., as determined by speech recognition component 114. In some implementations, word analysis component 116 may be configured to analyze words spoken by a particular user contemporaneous to visual presentation to the same particular user of one or more narrative textual messages. In some implementations, word analysis component 116 may be configured to detect, based on analysis, whether an editing command was spoken by a particular user. Editing commands may indicate requests for edits to narrative textual messages, parameters that describe states of message objects, parameter values expressed in narrative textual messages, and/or other information included in and/or related to narrative textual messages. As used herein, the term "edits" may include one or more of additions of information, insertions of information, modifications of information, (re-)location of information, replacement of information, removal of information, formatting of information, and/or other changes of (textual) information. In some implementations, different types of changes may be associated with different editing commands. For example, an editing command may indicate a request to edit an initial value of one of the parameters expressed in a narrative textual message by replacing the initial value with an edited value. For example, a particular editing command may indicate a request to edit the value of one of the parameters expressed in a narrative textual message by assigning a new value to the parameter, even if no value had been assigned to this parameter prior to processing of the particular editing command. In some implementations, an editing command may indicate a request to add or remove a section in a narrative textual message, a part of the body of a section, or all of the body of a section.

Command processing component 118 may be configured to process editing commands and/or other commands. In some implementations, command processing component 118 may be configured to process editing commands responsive to detection of the editing commands. In some implementations, processing an editing command regarding a particular parameter that lacks an initial value may include identifying the particular parameter, an edited value (or new value), and/or other information. Identifying a parameter may include correlating a spoken parameter identifier spoken by the user with the particular parameter. Identifying an edited or new value for the particular parameters may include correlating a spoken value (e.g., a numerical value) spoken by the user, e.g., as part of the editing command. Processing such an editing command may include editing the narrative textual message by inserting the edited or new value for the particular parameter in the narrative textual message. By way of non-limiting example, FIG. 4 illustrates an exemplary implementation of an interface for textual editing of a narrative textual message 40 through speech, as may be provided by system 100. As depicted, narrative textual message 40 may be a record of a visit by a medical patient (in this case Ms. Jane Roberts) to her doctor, a medical professional/caregiver, similar to FIG. 3. The user may have uttered speech that has been processed and/or otherwise analyzed (e.g., by speech recognition component 114, word analysis component 116, command processing component 118, and/or other components of system 100), and that has resulted in the addition of the depicted body of section 31*f*, including parameters and values for heart rate and blood pressure. In some implementations, newly edited sections of a narrative textual message (here, narrative textual message 40) may be highlighted and/or otherwise formatted to draw the user's attention to the latest changes. Narrative textual message 40 may be presented visually to the user as depicted in FIG. 4, so the user can easily verify whether the newly edited sections accurately reflect the user's editing commands and/or intention. In some implementations, system 100 may be configured to modify the terms and phrases used to comply with templates, standards, norms, and/or other types of preferences for the creation of records and/or documentation. For example, the user may have said "pulse of 75," but section 31f includes "Heart rate: 75 BPM".

Referring to FIG. 1, in some implementations, processing an editing command regarding a particular parameter that includes (in the narrative textual message) a particular initial value may include identifying the particular parameter, an edited value, and/or other information. Identifying a parameter may include correlating a spoken parameter identifier spoken by the user with the particular parameter. Identifying an edited value for the particular parameters may include correlating a spoken value (e.g., a numerical value) spoken by the user, e.g., as part of the editing command. Processing such an editing command may include editing the narrative textual message by replacing the (existing) initial value for the particular parameter in the narrative textual message with the edited value. By way of non-limiting example, FIG. 5 illustrates an exemplary implementation of an interface for textual editing of a narrative textual message 50 through speech, as may be provided by system 100. As depicted, narrative textual message 50 may be a record of a visit by a medical patient (in this case Ms. Jane Roberts) to her doctor, a medical professional/caregiver, similar to FIG. 4. The user may have uttered speech that has been processed and/or otherwise analyzed (e.g., by speech recognition component 114, word analysis component 116, command processing component 118, and/or other components of system 100), and that has resulted in the modification of a particular parameter within section 31f, here indicated by a subsection 51. In some implementations, system 100 may be configured to modify the terms and phrases used to comply with templates, standards, norms, and/or other types of preferences for the creation of records and/or documentation. For example, the user may have said "change systolic BP to 140," but section 31fas modified includes "Blood pressure: 140/91". Here, the blood pressure indicator that has changed (i.e., systolic blood pressure) is combined with the blood pressure indicator that has not been modified due to an editing command (i.e., diastolic blood pressure). In some implementations, system 100 may be configured to interpret the editing command based on the context and/or contents of the narrative textual message. For example, the user may have said "increase systolic BP by 10," to create narrative textual message 50 as depicted. As another example, the user may have said "change 130 to 140," to create narrative textual message 50 as depicted.

In some implementations, processing an editing command may further include identifying a second parameter and a second edited value for the second parameter. Processing such an editing command may further include further editing the narrative textual message by inserting the second edited value and/or replacing a second initial value for the second parameter in the narrative textual message with the second edited value. By way of non-limiting example, FIG. 6 illustrates an exemplary implementation of an interface for textual editing of a narrative textual message 60 through speech, as may be provided by system 100. As depicted, narrative textual message 60 may be a record of a visit by a medical patient (in this case Ms. Jane Roberts) to her doctor, a medical professional/caregiver, similar to FIG. 5. The user may have uttered speech that has been processed and/or otherwise analyzed (e.g., by speech recognition component 114, word analysis component 116, command processing component 118, and/or other components of system 100), and that has resulted in the modification of a particular parameter within section 31f, here indicated by a subsection 61. In some implementations, system 100 may be configured to modify the terms and phrases used to comply with templates, standards, norms, and/or other types of preferences for the creation of records and/or documentation. For example, the user may have said "change pulse to 65," but section 31f as modified includes "Heart rate: 65 BPM". In some implementations, system 100 may be configured to interpret the editing command based on the context and/or contents of the narrative textual message. For example, the user may have said "lower pulse by 10," to create narrative textual message 60 as depicted. As another example, the user may have said "change 75 to 65," to create narrative textual message 60 as depicted.

In some implementations, processing an editing command may include identifying a dictated narrative and either inserting corresponding text in a particular narrative textual message, replacing an existing section within the particular narrative textual message, and/or otherwise using the dictated narrative to change the particular narrative textual message. By way of non-limiting example, FIG. 7 illustrates an exemplary implementation of an interface for textual editing of a narrative textual message 70 through speech, as may be provided by system 100. As depicted, narrative textual message 70 may be a record of a visit by a medical patient (in this case Ms. Jane Roberts) to her doctor, a medical professional/caregiver, similar to FIG. 6. The user may have uttered speech that has been processed and/or otherwise analyzed (e.g., by speech recognition component 114, word analysis component 116, command processing component 118, and/or other components of system 100), and that has resulted in the modification of a particular paragraph within section 31d, here indicated by a subsection 71. For example, the user may have said "change the second paragraph in the history section as follows" and subsequently dictated the narrative in subsection 71 as depicted.

In some implementations, processing an editing command may further include identifying a third parameter and a third edited value for the third parameter. Processing such an editing command may further include further editing the narrative textual message by inserting the third edited value and/or replacing a third initial value for the third parameter in the narrative textual message with the third edited value. By way of non-limiting example, FIG. 7 illustrates an exemplary implementation of an interface for textual editing of a narrative textual message 70 through speech, as may be provided by system 100. The user may have uttered speech that has been processed and/or otherwise analyzed (e.g., by speech recognition component 114, word analysis component 116, command processing component 118, and/or other components of system 100), and that has resulted in the modification of a particular paragraph within section 31d, here indicated by a subsection 72. For example, the user may have said "change the schedule in the history section to Tuesday-Thursday" to create narrative textual message 70 as depicted including the changes in subsection 72. Here, the third parameter is a dialysis schedule, the initial third value is "Monday-Wednesday-Friday", and the edited third value is "Tuesday-Thursday."

Referring to FIG. 1, information transmittal component 120 may be configured to transmit information to client computing platforms 104 that causes visual presentations of narrative textual messages. In some implementations, the visual presentations may include edits caused by processing editing commands. In some implementations, processing of editing commands may facilitate exception-based documentation. In some implementations, transmitting information to a particular client computing platform may cause visual presentation of the narrative textual message including one or more edits caused by processing one or more editing commands, including one or more of a first editing command, a second editing command, a third editing command, and/or other editing commands.

Set storing component 122 may be configured to store, in the electronic storage, one or more sets of parameters included in one or more narrative textual messages. For example, a first parameter may be included in a first set of parameters. Correlating a spoken parameter identifier (e.g., as determined by speech recognition component 114) with the first parameter may include identifying the spoken parameter identifier as a candidate parameter identifier. In some implementations, the spoken parameter identifier and the first parameter may be not identically matched. For example, the terms "heart rate" and "pulse" may be correlated. For example, the terms "beats" and "beats per minute" may be correlated. Correlating the spoken parameter identifier with the first parameter may be performed responsive to the spoken parameter identifier being identified as a candidate parameter identifier. For example, the spoken parameter identifier may be determined to correlate with one of the individual parameters in a set of parameters in response to the spoken parameter identifier semantically corresponding to the one of the individual parameters in the set of parameters. In some implementations, correlation may be context-sensitive. For example, correlation may be dependent on one or more of the particular user, the particular patient, the type of patient, the type of treatment, the selected section of a narrative textual message, and/or other types of context. In some implementations, system 100 may learn correlations through usage, such that certain correlations are user-specific.

Parameter identifier comparing component 124 may be configured to compare spoken parameter identifiers with individual parameters in one or more sets of parameters to determine whether a particular spoken parameter identifier correlates to any of the individual parameters in the one or more sets of parameters.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor (s) 130 may be configured to execute components 108, 110, 112, 114, 116, 118, 120, 122, and/or 124, and/or other components. Processor(s) 130 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 130 includes multiple processing units, one or more of components 108, 110, 112, 114, 116, 118, 120, 122, and/or 124 may be implemented remotely from the other components, including but not limited to client computing platforms 104. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 130 may be configured to execute one or more additional components that may perform some or all of the functionality attributed below to one of components 108, 110, 112, 114, 116, 118, 120, 122, and/or 124.

FIG. 2 illustrates a method 200 for providing an interface for textual editing through speech, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in the electronic storage, a narrative textual message. The narrative textual message may define a state of a message object of the message. The narrative textual message may express parameter values for parameters that define the state of the message object. Operation 202 may be performed by one or more hardware processors configured by machine-readable instructions including a component that is the same as or similar to message storing component 108, in accordance with one or more implementations.

An operation 204 may include transmitting the narrative textual message to a client computing platform to facilitate visual presentation of the narrative textual message to a user via the client computing platform. Operation 204 may be performed by one or more hardware processors configured by machine-readable instructions including a component that is the same as or similar to message transmittal component 110, in accordance with one or more implementations.

An operation 206 may include receiving, from the client computing platform, user speech information representing audible speech uttered by the user while the user is being visually presented with the narrative textual message. Operation 206 may be performed by one or more hardware processors configured by machine-readable instructions including a component that is the same as or similar to speech receiving component 112, in accordance with one or more implementations.

An operation 208 may include performing speech recognition on the user speech information to determine words spoken by the user contemporaneous with visual presentation of the narrative textual message. Operation 208 may be performed by one or more hardware processors configured by machine-readable instructions including a component that is the same as or similar to speech recognition component 114, in accordance with one or more implementations.

An operation 210 may include analyzing the words spoken by the user contemporaneous to visual presentation of the narrative textual message to detect whether an editing command was spoken by the user during visual presentation of the narrative textual message. An editing command may indicate an edit to an initial value of one of the parameters expressed in the narrative textual message and an edited value to which the initial value is to be edited. Operation 210 may be performed by one or more hardware processors configured by machine-readable instructions including a component that is the same as or similar to word analysis component 116, in accordance with one or more implementations.

An operation 212 may include responsive to detection of an editing command, processing the editing command, wherein processing a first editing command that lacks an initial value includes determining a first parameter and a first edited value identified in the first editing command. Processing a first editing command that may lack an initial value includes editing the narrative textual message by replacing a first initial value for the first parameter in the narrative textual message with the first edited value. Operation 212 may be performed by one or more hardware processors configured by machine-readable instructions including a component that is the same as or similar to command processing component 118, in accordance with one or more implementations.

An operation 214 may include transmitting information to the client computing platform that causes visual presentation of the narrative textual message including edits caused by processing editing commands such that the narrative textual message is visually presented on the client computing platform with the first edited value in place of the first initial value by virtue of the first editing command being processed. Operation 214 may be performed by one or more hardware processors configured by machine-readable instructions including a component that is the same as or similar to information transmittal component 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing an interface for textual editing through speech, the system comprising:

electronic storage that stores a textual message, the textual message at least expressing parameters via parameter identifiers for the parameters, wherein parameter values for the parameters describe a state of a subject, further wherein the parameter values record individual assessments and/or measurements of the parameters taken with respect to the subject such that the parameter values of the parameters define the state of the subject, the parameters including a first parameter, the parameter values of the first parameter comprising numerical values, the textual message expressing the first parameter via a first parameter identifier for the first parameter; and one or more hardware processors configured by machine-readable instructions to:

effectuate, via a client computing platform, visual presentation of the textual message to a user;

receive, from the client computing platform, user speech information representing audible speech uttered by the user while the user is being visually presented with the textual message;

determine words spoken by the user contemporaneous with visual presentation of the textual message, wherein the words spoken by the user include i) a spoken parameter identifier that is different from the first parameter identifier for the first parameter expressed by the textual message but denotes the first parameter and an initial numerical value to the first parameter or a lack of the initial numerical value to the first parameter, and ii) an edited numerical value;

analyze the words spoken by the user to detect whether an editing command was spoken by the user, wherein the editing command includes i) the spoken parameter identifier and ii) the edited numerical value, wherein the editing command indicates a request for an edit to the initial numerical value of the first parameter or the lack of the initial numerical value of the first parameter expressed in the textual message with the edited numerical value for the first parameter;

responsive to detection of the editing command, process the editing command, wherein processing the editing command includes identifying: (a) the first parameter and (b) the edited numerical value present in the words spoken by the user, wherein identifying the first parameter includes (i) comparing the spoken parameter identifier with individual ones of the parameter identifiers included in the textual message to determine whether the spoken parameter identifier is identical to one of the parameter identifiers or denotes one of the parameters expressed by the textual message, and (ii) responsive to determining the spoken parameter identifier is not identical to the first parameter identifier for the first parameter but denotes the first parameter, correlate the spoken parameter identifier with the first parameter to identify the spoken parameter identifier as a candidate parameter identifier for the first parameter, wherein the candidate parameter identifier semantically corresponds to the first parameter, wherein correlation of the spoken parameter identifier that is not identical to the first parameter identifier for the first parameter with the first parameter is context sensitive and is dependent on the user, a type of the subject, and/or a type of treatment documented by the textual message, wherein processing the editing command that includes the lack of the initial numerical value includes editing the textual message by inserting the edited numerical value for the first parameter, and wherein processing the editing command that includes the initial numerical value includes editing the textual message by replacing the initial numerical value for the first parameter with the edited numerical value; and effectuate, via the client computing platform, visual presentation of the textual message including edits caused by processing the editing command such that the textual message is visually presented on the client computing platform with the edited numerical value included by virtue of the editing command being processed.

2. The system of claim 1, wherein processing the editing command further includes identifying a second parameter and a second edited value for the second parameter, and wherein processing the editing command further includes further editing the textual message by replacing a second initial value for the second parameter in the textual message with the second edited value.

3. The system of claim 2, wherein effectuating the visual presentation of the textual message including the edits caused by processing the editing command includes effectuating visual presentation of the textual message with the second edited value in place of the second initial value by virtue of the editing command being processed to replace the second initial value with the second edited value.

4. The system of claim 1, wherein processing a second editing command that lacks an initial value includes identifying a second parameter and a second edited value identified in the second editing command, wherein processing the second editing command that lacks an initial value includes editing the textual message by inserting the second edited value for the second parameter, and wherein effectuating the visual presentation of the textual message including the edits caused by processing editing commands includes effectuating visual presentation of the textual message with the second edited value included by virtue of the second editing command being processed to insert the second edited value.

5. The system of claim 1, wherein the textual message is part of an electronic record of the subject.

6. The system of claim 1, wherein the parameter values of a second parameter comprise descriptive values.

7. A method of providing an interface for textual editing through speech, the method comprising:

storing, in electronic storage, a textual message, the textual message at least expressing parameters via parameter identifiers for the parameters, wherein parameter values for the parameters describe a state of a subject, further wherein the parameter values record individual assessments and/or measurements of the parameters taken with respect to the subject such that the parameter values of the parameters define the state of the subject, the parameters including a first parameter, the parameter values of the first parameter comprising numerical values, the textual message expressing the first parameter via a first parameter identifier for the first parameter;

effectuating, via a client computing platform, visual presentation of the textual message to a user;

receiving, from the client computing platform, user speech information representing audible speech uttered by the user while the user is being visually presented with the textual message;

determining words spoken by the user contemporaneous with visual presentation of the textual message, wherein the words spoken by the user include i) a spoken parameter identifier that is different from the first parameter identifier for the first parameter expressed by the textual message but denotes the first parameter and an initial numerical value to the first parameter or a lack of the initial numerical value to the first parameter, and ii) an edited numerical value;

analyzing the words spoken by the user to detect whether an editing command was spoken by the user, wherein the editing command includes i) the spoken parameter identifier and ii) the edited numerical value, wherein the editing command indicates a request for an edit to the initial numerical value of the first parameter or the lack of the initial numerical value of the first parameter expressed in the textual message with the edited numerical value for the first parameter;

responsive to detection of the editing command, processing the editing command, wherein the processing the editing command includes identifying:

(a) the first parameter and (b) the edited numerical value present in the words spoken by the user, wherein identifying the first parameter includes (i) comparing the spoken parameter identifier with individual ones of the parameter identifiers included in the textual message to determine whether the spoken parameter identifier is identical to one of the parameter identifiers or denotes one of the parameters expressed by the textual message, and (ii) responsive to determining the spoken parameter identifier is not identical to the first parameter identifier for the first parameter but denotes the first parameter, correlate the spoken parameter identifier with the first parameter to identify the spoken parameter identifier as a candidate parameter identifier for the first parameter, wherein the candidate parameter identifier semantically corresponds to the first parameter, wherein correlation of the spoken parameter identifier that is not identical to the first parameter identifier for the first parameter with the first parameter is context sensitive and is dependent on the user, a type of the subject, and/or a type of treatment documented by the textual message;

wherein the processing the editing command that includes the lack of the initial numerical value includes editing the textual message by inserting the edited numerical value for the first parameter, and wherein the processing the editing command that includes the initial numerical value includes editing the textual message by replacing the initial numerical value for the first parameter with the edited numerical value; and effectuating, via the client computing platform, visual presentation of the textual message including edits caused by the processing the editing command such that the textual message is visually presented on the client computing platform with the edited numerical value included by virtue of the editing command being processed.

8. The method of claim 7, wherein the processing the editing command further includes identifying a second parameter and a second edited value for the second parameter, and wherein the processing the editing command further includes further editing the textual message by replacing a second initial value for the second parameter in the textual message with the second edited value.

9. The method of claim 8, wherein the effectuating the visual presentation of the textual message including the edits caused by the processing the editing command includes effectuating visual presentation of the textual message with the second edited value in place of the second initial value by virtue of the editing command being processed to replace the second initial value with the second edited value.

10. The method of claim 7, wherein processing a second editing command that lacks an initial value includes identifying a second parameter and a second edited value identified in the second editing command, wherein processing the second editing command that lacks an initial value includes editing the textual message by inserting the second edited value for the second parameter, and wherein the effectuating the visual presentation of the textual message including the edits caused by processing editing commands includes effectuating visual presentation of the textual message with the second edited value included by virtue of the second editing command being processed to insert the second edited value.

11. The method of claim 7, wherein the textual message is part of an electronic record of the subject.

12. The method of claim 7, wherein the parameter values of a second parameter comprise descriptive values.

13. A non-transitory computer-readable storage medium having instructions embodied thereon, the instructions being executable by one or more processors to perform a method for providing an interface for textual editing through speech, the method comprising:

storing, in electronic storage, a textual message, the textual message at least expressing parameters via parameter identifiers for the parameters, wherein parameter values for the parameters describe a state of a subject, further wherein the parameter values record individual assessments and/or measurements of the parameters taken with respect to the subject such that the parameter values of the parameters define the state of the subject, the parameters including a first parameter, the parameter values of the first parameter comprising numerical values, the textual message expressing the first parameter via a first parameter identifier for the first parameter;

effectuating, via a client computing platform, visual presentation of the textual message to a user;

receiving, from the client computing platform, user speech information representing audible speech uttered by the user while the user is being visually presented with the textual message;

determining words spoken by the user contemporaneous with visual presentation of the textual message, wherein the words spoken by the user include i) a spoken parameter identifier that is different from the first parameter identifier for the first parameter expressed by the textual message but denotes the first parameter and an initial numerical value to the first parameter or lack of the initial numerical value to the first parameter, and ii) an edited numerical value;

analyzing the words spoken by the user to detect whether an editing command was spoken by the user, wherein the editing command includes i) the spoken parameter identifier and ii) the edited numerical value, wherein the editing command indicates a request for an edit to the initial numerical value of the first parameter or the lack of the initial numerical value of the first parameter expressed in the textual message with the edited numerical value for the first parameter;

responsive to detection of the editing command, processing the editing command, wherein the processing the editing command includes identifying:

(a) the first parameter and (b) the edited numerical value present in the words spoken by the user, wherein identifying the first parameter includes (i) comparing the spoken parameter identifier with individual ones of the parameter identifiers included in the textual message to determine whether the spoken parameter identifier is identical to one of the parameter identifiers or denotes one of the parameters expressed by the textual message, and (ii) responsive to determining the spoken parameter identifier is not identical to the first parameter identifier for the first parameter but denotes the first parameter, correlate the spoken parameter identifier with the first parameter to identify the spoken parameter identifier as a candidate parameter identifier for the first parameter, wherein the candidate parameter identifier semantically corresponds to the first parameter, wherein correlation of the spoken parameter identifier that is not identical to the first parameter identifier for the first parameter with the first parameter is context sensitive and is dependent on the user, a type of the subject, and/or a type of treatment documented by the textual message;

wherein the processing the editing command that includes the lack of the initial numerical value includes editing the textual message by inserting the edited numerical value for the first parameter, and wherein the processing the editing command that includes the initial numerical value includes editing the textual message by replacing the initial numerical value for the first parameter with the edited numerical value; and effectuating, via the client computing platform, visual presentation of the textual message including edits caused by the processing the editing command such that the textual message is visually presented on the client computing platform with the edited numerical value included by virtue of the editing command being processed.

14. The computer-readable storage medium of claim 13, wherein the processing the editing command further includes identifying a second parameter and a second edited value for the second parameter, and wherein the processing the editing command further includes further editing the textual message by replacing a second initial value for the second parameter in the textual message with the second edited value.

15. The computer-readable storage medium of claim 14, wherein the effectuating the visual presentation of the textual message including edits caused by the processing the editing command includes effectuating visual presentation of the textual message with the second edited value in place of the second initial value by virtue of the editing command being processed to replace the second initial value with the second edited value.

16. The computer-readable storage medium of claim 13, wherein processing a second editing command that lacks an initial value includes identifying a second parameter and a second edited value identified in the second editing command, wherein processing the second editing command that lacks an initial value includes editing the textual message by inserting the second edited value for the second parameter, and wherein the effectuating the visual presentation of the textual message including the edits caused by processing editing commands includes effectuating visual presentation of the textual message with the second edited value included by virtue of the second editing command being processed to insert the second edited value.

17. The computer-readable storage medium of claim 13, wherein the textual message is part of an electronic record of the subject.

18. The computer-readable storage medium of claim 13, wherein the parameter values of a second parameter comprise descriptive values.

* * * * *